(12) United States Patent
Ewert et al.

(10) Patent No.: US 9,925,856 B2
(45) Date of Patent: Mar. 27, 2018

(54) ARRANGEMENT IN A MOTOR VEHICLE

(71) Applicant: Dr. Ing. h.c. F. Porsche Aktiengesellschaft, Stuttgart (DE)

(72) Inventors: Eduard Ewert, Karlsruhe (DE); Ralf Keller, Niefern-Oeschelbronn (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/208,617

(22) Filed: Jul. 13, 2016

(65) Prior Publication Data

US 2017/0028833 A1    Feb. 2, 2017

(30) Foreign Application Priority Data

Jul. 30, 2015  (DE) .................. 10 2015 112 493

(51) Int. Cl.
| | |
|---|---|
| *B60K 1/04* | (2006.01) |
| *B62D 21/15* | (2006.01) |
| *B62D 21/18* | (2006.01) |
| *B62D 21/11* | (2006.01) |

(52) U.S. Cl.
CPC .............. *B60K 1/04* (2013.01); *B62D 21/11* (2013.01); *B62D 21/15* (2013.01); *B62D 21/155* (2013.01); *B62D 21/18* (2013.01); *B60K 2001/0411* (2013.01); *B60K 2001/0416* (2013.01); *B60Y 2306/01* (2013.01)

(58) Field of Classification Search
CPC .............. B60K 1/04; B60K 2001/0411; B60K 2001/0416; B62D 21/15; B62D 21/18; B60Y 2306/01
See application file for complete search history.

(56) References Cited

U.S. PATENT DOCUMENTS

| | | | | |
|---|---|---|---|---|
| 7,654,351 | B2 * | 2/2010 | Koike ....................... | B60K 1/04 180/68.1 |
| 7,717,207 | B2 * | 5/2010 | Watanabe ................ | B60K 1/04 180/274 |
| 7,836,999 | B2 * | 11/2010 | Kato ....................... | B62D 21/11 180/312 |
| 7,913,787 | B2 * | 3/2011 | Watanabe ................ | B60K 1/04 180/68.5 |
| 8,051,934 | B2 * | 11/2011 | Kiya ....................... | B60K 1/04 180/274 |
| 9,283,838 | B2 * | 3/2016 | Ohashi ..................... | B60K 1/04 |

(Continued)

FOREIGN PATENT DOCUMENTS

| | | |
|---|---|---|
| DE | 102008027894 A1 | 12/2009 |
| DE | 102011000482 A1 | 8/2012 |

(Continued)

*Primary Examiner* — Darlene P Condra
(74) *Attorney, Agent, or Firm* — Leydig, Voit & Mayer, Ltd.

(57) ABSTRACT

An arrangement in a motor vehicle includes a subframe. An energy source is arranged in a region of the subframe and components are assigned to the energy source. The energy source and the components are positioned in front of the subframe in a crash direction. The subframe has a window which exceeds the external dimensions of at least one of the energy source or the components and is configured to allow the at least one of the energy source or the components to dip into the window.

11 Claims, 4 Drawing Sheets

(56) References Cited

U.S. PATENT DOCUMENTS

| | | | |
|---|---|---|---|
| 9,409,470 B2* | 8/2016 | Trentin | B60K 1/04 |
| 9,469,182 B2* | 10/2016 | Merkel | B60K 1/00 |
| 9,517,686 B1* | 12/2016 | Paramasivam | B60K 1/04 |
| 2002/0191385 A1* | 12/2002 | Miyazaki | H05K 9/0016 361/799 |
| 2003/0070858 A1* | 4/2003 | Kondo | B60K 1/04 180/291 |
| 2007/0007060 A1* | 1/2007 | Ono | B60K 1/04 180/65.31 |
| 2007/0215397 A1* | 9/2007 | Suzuki | B60K 1/00 180/65.31 |
| 2008/0283316 A1* | 11/2008 | Ono | B60K 15/063 180/68.5 |
| 2011/0132676 A1* | 6/2011 | Kodaira | B60K 1/04 180/65.51 |
| 2012/0199406 A1 | 8/2012 | Bender et al. | |
| 2013/0119704 A1* | 5/2013 | Amano | B60K 1/00 296/187.1 |
| 2014/0326526 A1* | 11/2014 | Yasui | B62D 21/11 180/274 |
| 2014/0374176 A1 | 12/2014 | Merkel et al. | |
| 2016/0083012 A1 | 3/2016 | Stenzenberger et al. | |
| 2016/0137046 A1* | 5/2016 | Song | B60K 1/04 180/68.5 |
| 2017/0066478 A1* | 3/2017 | Baccouche | B62D 21/155 |

FOREIGN PATENT DOCUMENTS

| | | |
|---|---|---|
| DE | 102011081836 A1 | 2/2013 |
| DE | 102013106433 A1 | 12/2014 |
| DE | 102013210576 A1 | 12/2014 |
| EP | 2353971 B1 | 8/2011 |

* cited by examiner

ARRANGEMENT IN A MOTOR VEHICLE

CROSS-REFERENCE TO PRIOR APPLICATIONS

Priority is claimed to German Patent Application No. DE 10 2015 112 493.9, filed on Jul. 30, 2015, the entire disclosure of which is hereby incorporated by reference herein.

FIELD

The invention relates to an arrangement in a motor vehicle, in particular in a motor vehicle with an electric or hybrid drive, with a subframe and an energy source with the components which are assigned to the latter, the energy source and its components being positioned in front of the subframe in the crash direction.

BACKGROUND

Energy sources for electric or hybrid drives in motor vehicles, for example high voltage batteries or fuel cells, and the components which are necessarily assigned to them have a very high inert mass due to the design. This can result in problems with the absorption or dissipation of the kinetic energy which occurs in the case of a crash: in the case of a crash, uncontrolled movements of energy sources of this type can trigger heavy damage to vehicle components which lie in the crash direction and also to the energy source itself and the components which are assigned to it. Possibly, damage to parts of the interior and possibly even injuries to the passengers can arise as a result of penetration of said energy source and/or components, for example, into the passenger compartment.

The prior art has disclosed a number of proposals which are intended firstly to protect the energy source and secondly to avoid damage of this type. For instance, DE 10 2008 027 894 A1 discloses and describes an arrangement which absorbs crash energy in a motor vehicle, in which arrangement the energy source is positioned close to a subframe, and in which arrangement a deformation element for absorbing crash energy is arranged between the energy source and the subframe. Said additional deformation element can be fastened to the subframe.

It is known from EP 2 353 971 B1 to provide the energy source with a frame-shaped structure which is to be capable of guiding crash energy past the energy source in order to protect the latter.

Furthermore, it is known from DE 10 2013 106 433 A1 to provide a special load-bearing frame for an electrically driven motor vehicle, in which load-bearing frame the energy source is accommodated such that it is protected against damage by way of special collision panels.

SUMMARY

In an embodiment, the present invention provides an arrangement in a motor vehicle. The arrangement includes a subframe. An energy source is arranged in a region of the subframe and components are assigned to the energy source. The energy source and the components are positioned in front of the subframe in a crash direction. The subframe has a window which exceeds the external dimensions of at least one of the energy source or the components and is configured to allow the at least one of the energy source or the components to dip into the window.

BRIEF DESCRIPTION OF THE DRAWING

The present invention will be described in even greater detail below based on the exemplary Figure. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following.

DETAILED DESCRIPTION

Figure 1:
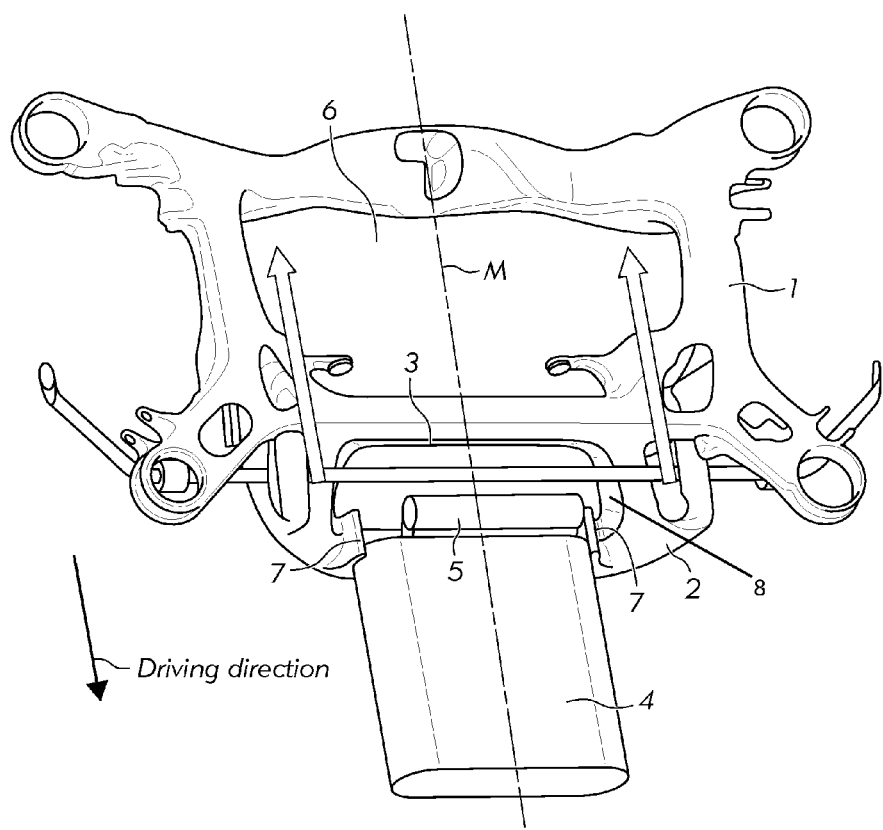
FIG. 1 diagrammatically shows one exemplary embodiment of an arrangement according to the invention.

In an embodiment, the present invention provides an arrangement in a motor vehicle for the accommodation of the energy source, which arrangement affords as high safety as possible in the case of a crash in a weight-saving manner with as little structural complexity as possible.

According to an embodiment of the invention, this is achieved by the subframe of a motor vehicle having a window which exceeds the external dimensions of the energy source which is arranged in the region of the subframe and/or the components which are assigned to said energy source, for the energy source and/or components of the energy source to dip into.

As viewed in the driving direction, the energy source and/or the components which are assigned to it can preferably be arranged in front of the rear subframe, as an alternative behind the rear subframe, and in turn as an alternative in front of a front subframe, and further as an alternative behind a front subframe.

In said four alternative arrangements, dipping of the energy source and associated components into the free and largely crash-protected interior of a subframe during the occurrence of crash energy from the front or from the rear will proceed in a substantially correspondingly similar manner.

The outer edge dimensions of the energy source and/or the components which are assigned to it preferably correspond substantially to the profile of a wall element of the subframe.

The suspension or fastening of the energy source and/or the components which are assigned to it is preferably configured in the region of a subframe in such a way that, in the case of a crash, said energy source and/or the components which are assigned to it are/is capable of performing a substantially linear movement in the direction of the window in the subframe.

In an embodiment, the window can have guide faces on the edge side, on which guide faces the energy source and/or the components which are assigned to it can be guided away largely without damage into crash-protected zones.

The upper edge of the window in the subframe can be arranged so as to be offset in the vehicle longitudinal direction with respect to the lower edge. A greater dipping depth is therefore provided in the upper and in the lower region of the subframe. Correspondingly, the side edges of the window in the subframe can be arranged offset in the vehicle longitudinal direction for different dipping depths.

The inventive solution relates, in particular, to a motor vehicle, in particular a motor vehicle with an electric or hybrid drive with an arrangement of subframe and energy source with the components which are assigned to it as described above.

The details, special characteristics and features of the subject matter of the invention are described in greater detail in the following text using one exemplary embodiment with reference to the single Figure.

A subframe 1, which is a rear subframe in a motor vehicle, has a window 3 in its front wall element 2 in the driving direction. The window has guide faces 8. In the exemplary embodiment which is shown, the window 3 is arranged approximately centrally with respect to the vehicle center M; however, a lateral offset of the arrangement or correspondingly of the window is readily conceivable. As viewed in the driving direction, an energy source 4, for example a high voltage battery in the motor vehicle, is arranged in front of the subframe 1 and its window 3. The energy source 4 is assigned components 5 for operating it. The dimensions of the window 3 exceed the external dimensions of the energy source 4 and/or the components 5 which are assigned to said energy source 4. A suspension or fastening 7 of the energy source 4 and/or the components 5 is included.

In the case of a crash, if the crash forces are introduced from the front of the vehicle, the inert mass of the energy source 4 would possibly move in the direction of the subframe 1 and would dip without braking through the window 3 (see arrow direction) into the free space 6 within or below the subframe. Optimum protection of the vehicle components is achieved by way of an arrangement of this type, but also, in particular, protection of the energy source 4 itself and/or of the components 5 which are important for its operation. It can be prevented reliably that the high inert mass of the energy source 4 with its components 5 triggers damage and the consequences of damage to the vehicle and possibly even to passengers.

The window for dipping of the energy source in the case of a crash is to be provided in the front or in the rear wall element of the respective subframe in a manner which is dependent on the positioning of the energy source 4 and the components 5 which are necessary for its operation in front of or behind a rear or a front subframe. In this way, the advantages of an arrangement of this type are available in their full extent both in the case of crashes from the front and also in the case of rear impact collisions, in order to absorb the introduction of crash energy from the rear region of a vehicle.

If, for space reasons or other reasons, linear dipping of the energy source 4 and/or the components 5 which are assigned to it into the free region 6 of the subframe is not possible or is insufficiently possible on account of the available space, it is conceivable to provide the window 3 with guide faces on the edge side, on which guide faces the energy source 4 and/or the components 5 which are assigned to it can be guided away downward, upward or else laterally into available free spaces.

Depending on the construction of the subframe 1 and its wall elements, upper edges, lower edges and side edges can be arranged such that they are offset in the driving direction, with the result that in each case different dipping depths for the energy source 4 and/or its components 5 are available, for example in the case of differently running outer contours of the energy source 4 and/or components 5.

Figure 2:
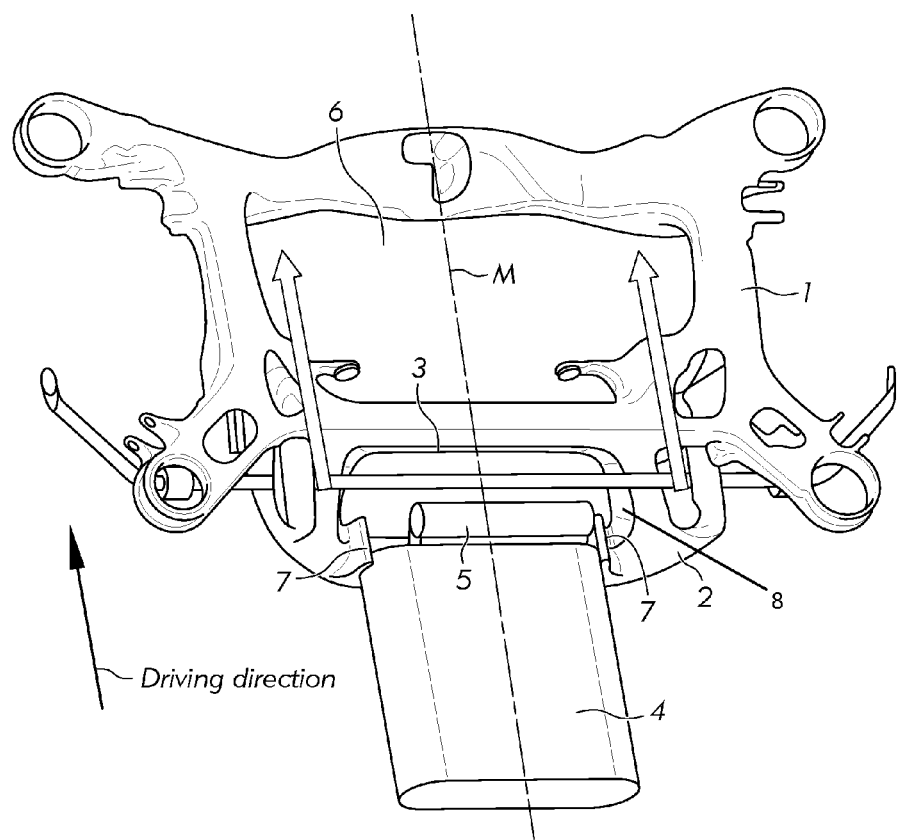
FIG. 2 diagrammatically shows one exemplary embodiment of an arrangement according to the invention.
Figure 3:
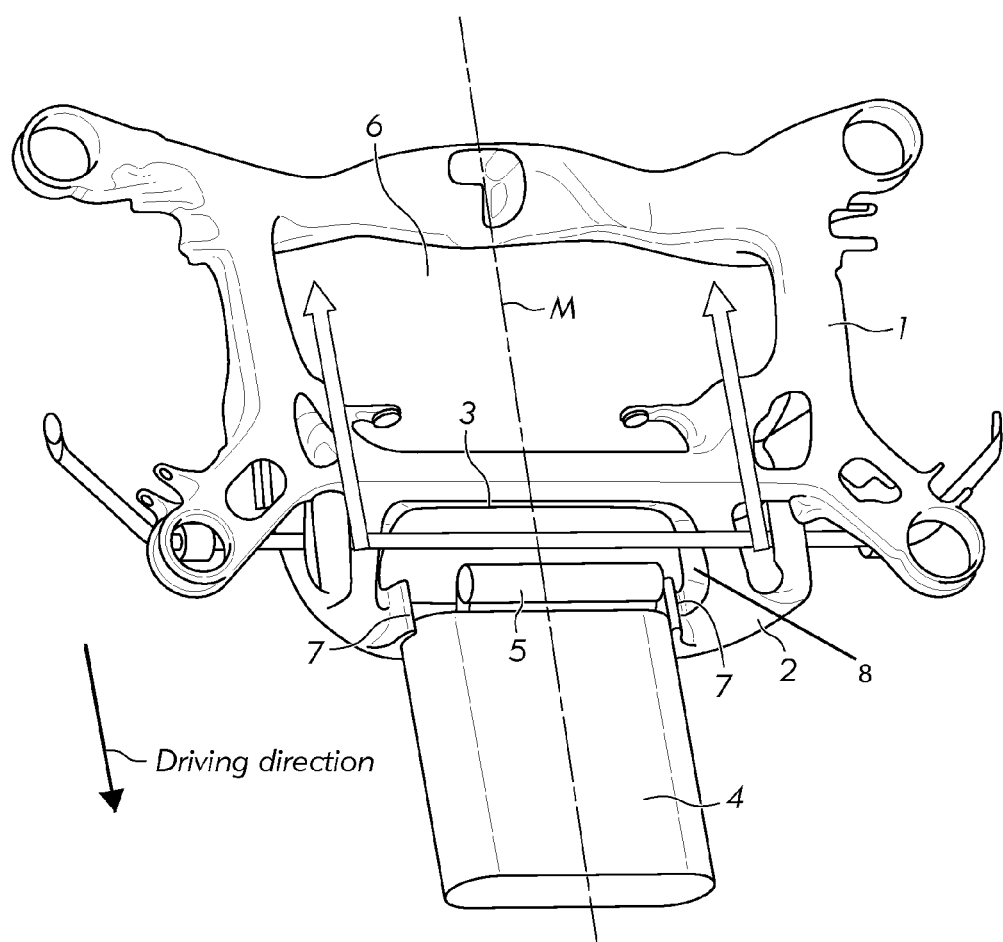
FIG. 3 diagrammatically shows one exemplary embodiment of an arrangement according to the invention.
Figure 4:
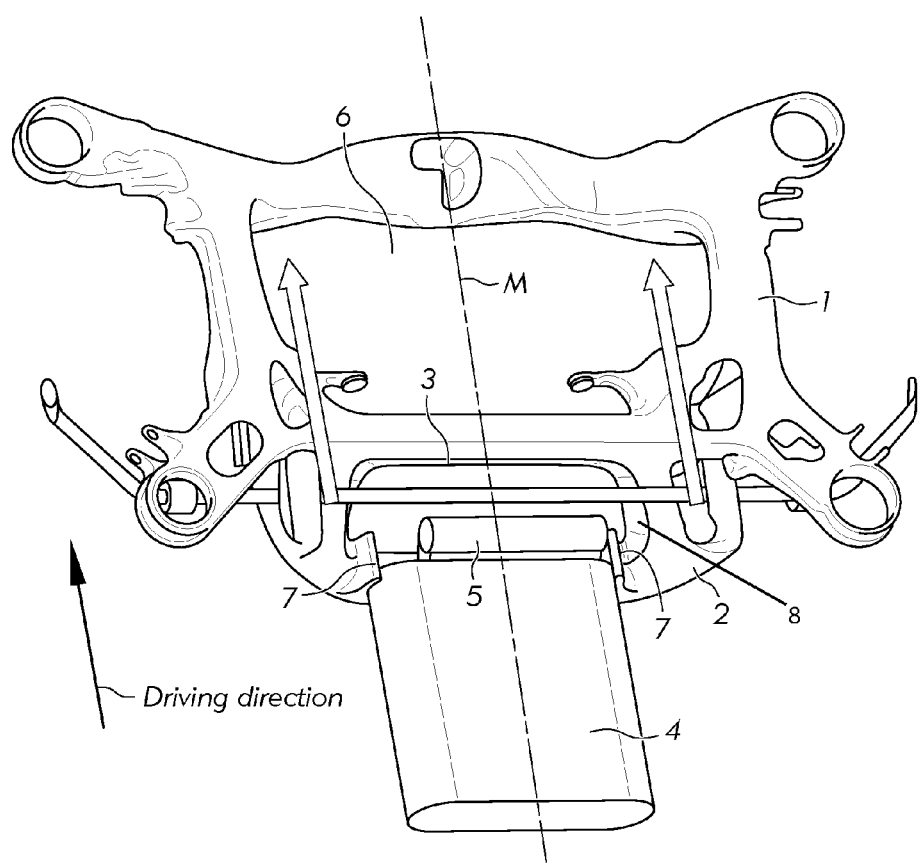
FIG. 4 diagrammatically shows one exemplary embodiment of an arrangement according to the invention.

In FIG. 2, the subframe 1 is a rear subframe, and the energy source 5 is located behind the subframe 1 in the driving direction. In FIG. 3, the subframe 1 is a front subframe, and the energy source 5 is located in front of the subframe 1 in the driving direction. In FIG. 4, the subframe 1 is a front subframe, and the energy source 5 is located behind the subframe 1 in the driving direction.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF DESIGNATIONS

M Vehicle center
1 Subframe
2 Wall element
3 Window
4 Energy source
5 Components which are assigned to the energy source
6 Free region of the subframe

What is claimed is:

1. An arrangement in a motor vehicle, the arrangement comprising:
    a subframe; and
    an energy source arranged in a region of the subframe and components which are assigned to the energy source, the energy source and the components being positioned at least one of in front of the subframe in a driving direction or behind the subframe in the driving direction,
    wherein the subframe has a window which exceeds the external dimensions of at least one of the energy source or the components and is configured to allow the at least one of the energy source or the components to dip into the window.

2. The arrangement as claimed in claim 1, wherein the subframe is a rear subframe, and wherein the at least one of the energy source or the components is arranged in front of the rear subframe as viewed in the driving direction.

3. The arrangement as claimed in claim 1, wherein the subframe is a rear subframe, and wherein the at least one of the energy source or the components is arranged behind the rear subframe as viewed in the driving direction.

4. The arrangement as claimed in claim 1, wherein the subframe is a front subframe, and wherein the at least one of the energy source or the components is arranged in front of the front subframe as viewed in the driving direction.

5. The arrangement as claimed in claim 1, wherein the subframe is a front subframe, and wherein the at least one of the energy source or the components is arranged behind the front subframe as viewed in the driving direction.

6. The arrangement as claimed in claim 1, wherein the external dimensions of the at least one of the energy source or the components is designed so as to correspond substantially to a profile of a wall element of the subframe.

7. The arrangement as claimed in claim 1, wherein a suspension or fastening of the at least one of the energy source or the components is configured in a region of the subframe in such a way that, in case of a crash, the at least one of the energy source or the components is capable of performing a substantially linear movement in a direction of the window in the subframe.

8. The arrangement as claimed in claim 1, wherein the window in the subframe has guide faces on an edge side, the guide faces being configured to guide away the at least one of the energy source or the components substantially without damage.

9. The arrangement as claimed in claim 1, wherein an upper edge of the window is arrangeable so as to be offset in a longitudinal direction of the vehicle with respect to the lower edge.

10. The arrangement as claimed in claim 1, wherein side edges of the window are arrangeable against one another in a longitudinal direction of the vehicle.

11. A motor vehicle having an electric or hybrid drive, the vehicle comprising:
    an arrangement comprising:
        a subframe; and
        an energy source arranged in a region of the subframe and components which are assigned to the energy source, the energy source and the components being positioned at least one of in front of the subframe in a driving direction or behind the subframe in the driving direction,
    wherein the subframe has a window which exceeds the external dimensions of at least one of the energy source or the components and is configured to allow the at least one of the energy source or the components to dip into the window.

* * * * *